(12) United States Patent
Tameshige et al.

(10) Patent No.: US 12,526,181 B2
(45) Date of Patent: Jan. 13, 2026

(54) OPERATION MANAGEMENT SYSTEM, OPERATION MANAGEMENT METHOD, AND OPERATION MANAGEMENT PROGRAM

(71) Applicant: Hitachi, Ltd., Tokyo (JP)

(72) Inventors: Takashi Tameshige, Tokyo (JP); Jun Kitawaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 24 days.

(21) Appl. No.: 18/441,459

(22) Filed: Feb. 14, 2024

(65) Prior Publication Data

US 2025/0097098 A1 Mar. 20, 2025

(30) Foreign Application Priority Data

Sep. 15, 2023 (JP) ................................. 2023-150271

(51) Int. Cl.
*H04L 41/0695* (2022.01)
*H04L 41/084* (2022.01)
*H04L 41/0866* (2022.01)
*H04L 41/18* (2022.01)

(52) U.S. Cl.
CPC ...... *H04L 41/0695* (2013.01); *H04L 41/0843* (2013.01); *H04L 41/0866* (2013.01); *H04L 41/18* (2013.01)

(58) Field of Classification Search
CPC ...... G06F 11/28; G06F 11/36; H04L 41/0695; H04L 41/08; H04L 41/084; H04L 41/0843; H04L 41/0866; H04L 41/0869; H04L 41/0873; H04L 41/14; H04L 41/18
See application file for complete search history.

(56) References Cited

U.S. PATENT DOCUMENTS

| | | | |
|---|---|---|---|
| 2010/0057780 A1* | 3/2010 | Isobe | G06F 9/5027 707/E17.048 |
| 2014/0379883 A1* | 12/2014 | Filgueiras | H04L 41/0869 709/223 |
| 2022/0070016 A1* | 3/2022 | Dai | H04L 12/2821 |
| 2022/0100585 A1* | 3/2022 | Keating | H04L 41/0866 |
| 2023/0006880 A1* | 1/2023 | Kaufman | H04L 41/0873 |

FOREIGN PATENT DOCUMENTS

JP 5848317 B2 1/2016

* cited by examiner

*Primary Examiner* — Vivek Srivastava
*Assistant Examiner* — William C Mcbeth
(74) *Attorney, Agent, or Firm* — MATTINGLY & MALUR, PC

(57) ABSTRACT

The present invention includes: a plurality of operation templates describing at least one procedure for managing operation of a system; a conflict determination unit that determines whether or not, upon execution of a specific procedure included in a specific operation template among the plurality of operation templates, a conflict possibly hindering execution of another procedure included in another operation template among the plurality of operation templates will be generated; and a presentation unit that presents information on the specific procedure to an outside before the specific procedure is actually executed in a case where the conflict determination unit determines that execution of the specific procedure will generate the conflict.

9 Claims, 16 Drawing Sheets

| ID | CUSTOMER ID | CLASSIFICATION | ITEM | RANGE |
|---|---|---|---|---|
| 1 | 000-0001 | Cloud | provider | hitachi private cloud |
| 2 | 000-0001 | Cloud | region | tokyo |
| 3 | 000-0001 | Compute | flavor | xlarge |
| 4 | 000-0001 | Compute | scaleout | yes, 5-10 |
| 5 | 000-0001 | Network | gateway | abcdefg |
| 6 | 000-0001 | Network | security | |
| 7 | 000-0001 | Storage | blockStorage | Hitachi VSP |
| 8 | 000-0001 | Storage | fileStorage | Hitachi VSP |
| ... | ... | ... | ... | ... |
| n | B | cloud | provider | AWS |
| ... | ... | ... | ... | ... |

FIG. 5

| ID | OPERATION TEMPLATE NAME | PROCEDURE |
|---|---|---|
| 1 | DR SETTING AND START OF OPERATION | PROCEDURE 1-1 |
| 2 | DR SETTING AND START OF OPERATION | PROCEDURE 1-2 |
| 3 | DR SETTING AND START OF OPERATION | PROCEDURE 1-3 |
| 4 | DR SETTING AND START OF OPERATION | PROCEDURE 1-4 |
| 5 | DR SWITCHING | PROCEDURE 2-1 |
| ⋮ | ⋮ | ⋮ |
| n | OPERATION TEMPLATE n | PROCEDURE n-1 |
| ⋮ | ⋮ | ⋮ |
| m | OPERATION TEMPLATE m | PROCEDURE m-1 |
| ⋮ | ⋮ | ⋮ |

FIG. 6

| PROCEDURE ID 901 | BODY 902 | ATTRIBUTE 903 | CONFLICT 904 | RESOLUTION PROPOSAL 905 |
|---|---|---|---|---|
| 1 | $Role logs in $Target of $Primary_site with $Authority | R | — | |
| 2 | $Role gets $Config of $Primary_site | R | PROCEDURE ID101 | |
| ... | ... | ... | | |
| 7 | $Role creates a LU in $Primary_site with $Authority | W | | |
| 8 | $Role initiates a LU with $Primary_site with $Authority | W | | |
| 9 | $Role sets $Function ($Primary_site, $Secondary_site) | W | | |
| 10 | $Role sets $DR_condition | W | | |
| ... | ... | ... | | |

| ID 1101 | CUSTOMER NAME 1102 | ITEM 1103 | RANGE 1104 | DUPLICATION PERMISSION 1105 | VALID RANGE 1106 |
|---|---|---|---|---|---|
| 1 | A | CustomerId | 000-0000, zzz-zzzz | NG | all |
| 2 | A | Role | operator, customer, ... | OK | CUSTOMER |
| 3 | A | Authority | administrator, user, ... | OK | CUSTOMER |
| 4 | A | Target | storage_management_tools, tool-a, tool-b, ... | OK | all |
| 5 | A | Primary_site | 10.0.0.10 | NG | all |
| 6 | A | Secondary_site | 10.0.254.10 | NG | all |
| 7 | A | Primary_configuration | primary_hosts.conf | NG | CUSTOMER |
| 8 | A | Secondary_configuration | secondary_hosts.conf | NG | CUSTOMER |
| ⋮ | ⋮ | ⋮ | ⋮ | ⋮ | |
| n | B | CustomerId | 000-0000, zzz-zzzz | NG | all |
| ⋮ | ⋮ | ⋮ | ⋮ | ⋮ | |

211

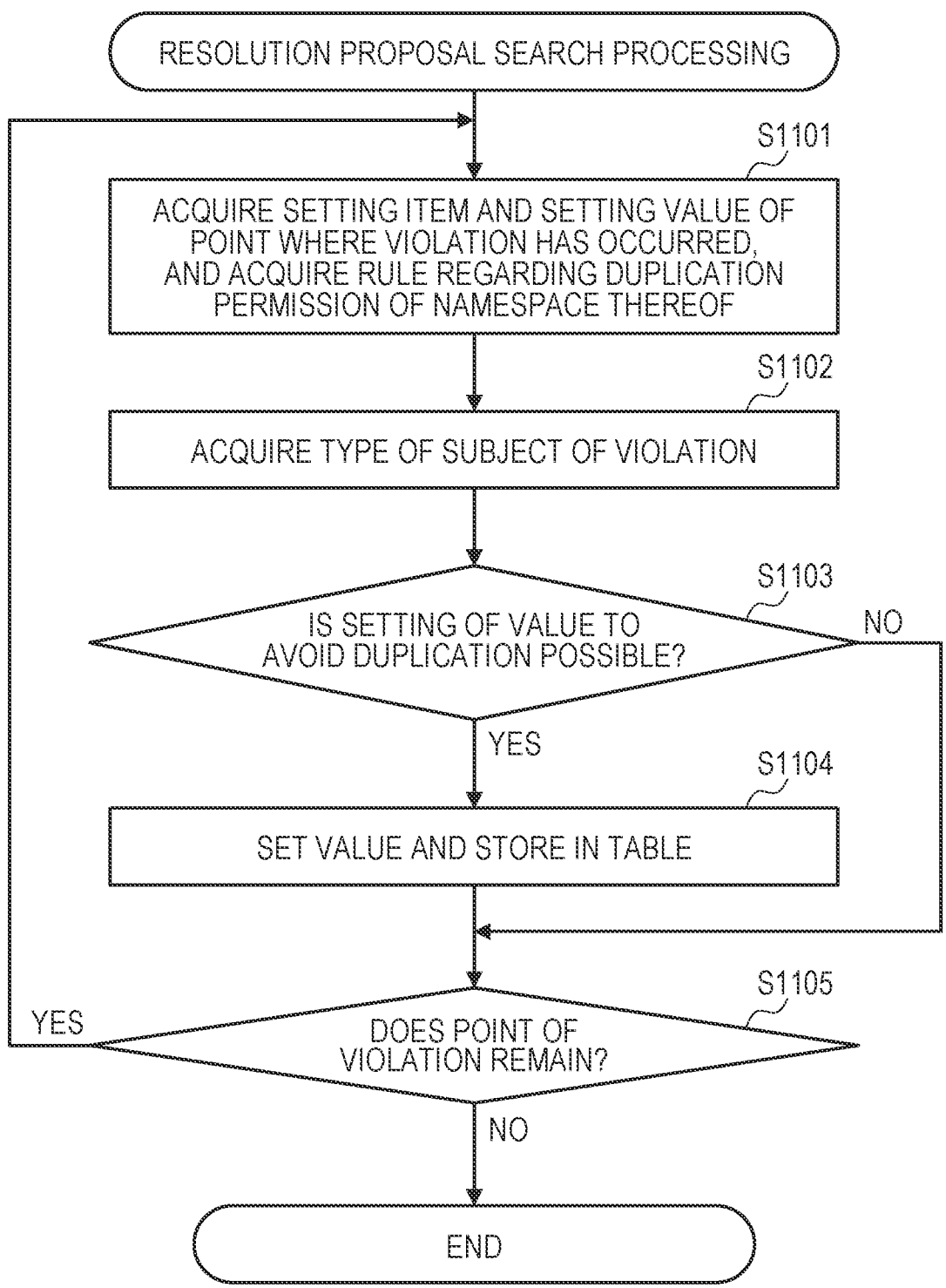

FIG. 12

CONFLICT CONTENT PRESENTATION SCREEN 1200

| ID 1201 | CUSTOMER ID 1202 | CONFLICT SITE 1203 | CONFLICT DESTINATION 1204 | REASON 1205 |
|---|---|---|---|---|
| 1 | 000-0001 | OPERATION TEMPLATE 1, PROCEDURE 1-1 | OPERATION TEMPLATE 2, PROCEDURE 2-1 | DUPLICATION OF OPERATION TARGET |
| 2 | 000-0001 | CUSTOMER PROFILE, 000-0001, $hostName | 1. OPERATION TEMPLATE 2, PROCEDURE 2-1<br>2. OPERATION TEMPLATE 3, PROCEDURE 3-3 | DUPLICATION OF $hostName.<br>1. OPERATION TEMPLATE 2, PROCEDURE 2, $hostName<br>2. OPERATION TEMPLATE 3, PROCEDURE 3-3 |
| ... | ... | ... | ... | ... |
| n | 000-0002 | CUSTOMER B | NO CONFLICT | --- |
| ⋮ | ⋮ | ⋮ | ⋮ | ⋮ |

FIG. 13

CONFLICT RESOLUTION PRESENTATION SCREEN 1300

| ID 1301 | INFORMATION 1302 | CUSTOMER ID 1303 | CONFLICT SITE 1304 | CONFLICT DESTINATION 1305 | RESOLUTION 1306 |
|---|---|---|---|---|---|
| 1 | Warning | 000-0001 | OPERATION TEMPLATE, PROCEDURE 1-1 | OPERATION TEMPLATE 2, PROCEDURE 2-1 | DUPLICATION OF OPERATION TARGET |
| 2 | Error | 000-0001 | CUSTOMER PROFILE, 000-0001, $hostName | 1. OPERATION TEMPLATE 2, PROCEDURE 2-1, $hostName<br>2. OPERATION TEMPLATE 3, PROCEDURE 3-3, $hostName | VARIABLE FOR WHICH DUPLICATION IS NOT PERMITTED. CORRECT $hostName VALUE.<br>1. OPERATION TEMPLATE 2, PROCEDURE 2-1, $hostName<br>2. OPERATION TEMPLATE 3, PROCEDURE 3-3, $hostName |
| ... | ... | ... | ... | ... | ... |
| n | Information | 000-000n | NO POINT OF CONFLICT BETWEEN OPERATION TEMPLATE AND CUSTOMER PROFILE | NO CONFLICT | ... |
| ⋮ | ⋮ | ⋮ | ⋮ | ⋮ | ⋮ |

FIG. 14

MANAGED SERVICE SCREEN

CUSTOMER ID: 000-0001

| ID | INFORMATION | RESPONSIBLE PARTY | CONFLICT SITE | CONFLICT DESTINATION | PRIORITY LEVEL (S/A/B/C...) |
|---|---|---|---|---|---|
| 1 | Warning | INFRASTRUCTURE TEAM | OPERATION TEMPLATE, PROCEDURE 1-1 | OPERATION TEMPLATE 2, PROCEDURE 2-1 | B |
| 2 | Error | INFRASTRUCTURE TEAM | CUSTOMER PROFILE 000-0001, $hostName | 1. OPERATION TEMPLATE 2, PROCEDURE 2-1, $hostName<br>2. OPERATION TEMPLATE 3, PROCEDURE 3-3, $hostName | S |
| ... | ... | ... | ... | ... | ... |
| n | Information | APPLICATION A TEAM | NO CONFLICT | NO CONFLICT | ... |

FIG. 16

| ID 1501 | CUSTOMER ID 1502 | TIME 1503 | VARIABLE 1504 | VALUE 1505 | TRIGGER 1506 |
|---|---|---|---|---|---|
| 1 | 000-0001 | 2023-08-02 17:27:38.101 | Primary_site | 10.0.0.10 | OPERATION TEMPLATE NAME "xxx01", PROCEDURE "yyy01-2" |
| 2 | 000-0001 | 2023-08-02 23:25:55.005 | Primary_site | 10.0.254.10 | OPERATION TEMPLATE NAME "xxx03", PROCEDURE "yyy03-1" |
| 3 | 000-0001 | 2023-08-03 07:01:02.994 | Primary_site | 10.0.0.10 | OPERATION TEMPLATE NAME "xxxn", PROCEDURE "yyy0n-1" |
| : | : | : | : | : | : |
| n | 000-0001 | | | | |
| : | : | : | : | : | : |
| m | 000-000A | | | | |
| : | : | : | : | : | : |

OPERATION MANAGEMENT SYSTEM, OPERATION MANAGEMENT METHOD, AND OPERATION MANAGEMENT PROGRAM

CROSS-REFERENCE TO RELATED APPLICATION

The present application claims priority from Japanese application JP2023-150271, filed on Sep. 15, 2023, the content of which is hereby incorporated by reference into this application.

BACKGROUND OF THE INVENTION

1. Field of the Invention

The present invention relates to an operation management system, an operation management method, and an operation management program that manage operation of a system, and that are suitable for application to an operation management system capable of changing the system operation by means of procedures described in operation templates, for example.

2. Description of the Related Art

In order to follow rapid changes in market needs, advancements have been made in digital transformation (DX) of customer business tasks. The approach of frequently updating applications to reflect market needs such as the addition and improvement of functions, improved performance, and so forth, is widespread. Beyond responding to market needs, security patches need to be applied as soon as possible to keep applications and IT systems secure. It is necessary to check whether a business task of a business task system, which includes such an application, can be run and operated without any problems after an update so that the business task is not hindered before and after the update.

Where system operation management is concerned, JP 5848317 A indicates that, in order to simplify the creation and management of a work plan of a management system, a setting value is inputted at the same time as the creation of an operation work manual on the basis of a template, but a creator is notified of an error in a case where a parameter constituting a setting value to be inputted in advance has not been set.

SUMMARY OF THE INVENTION

In the management system disclosed in JP 5848317 A, in order to ensure stable operation after a system change, a skilled higher-level administrator examines the operation work manual in detail and confirms that no failure will occur when the operator changes the system as per an operating procedure manual. However, there is a possibility that such confirmation work will incur operating costs in a situation where a system is frequently changed.

The present invention was conceived of in view of the above points, and an object of the present invention is to propose an operation management system, an operation management method, and an operation management program that enable a reduction in operating costs associated with system changes.

In order to solve this problem, the present invention is configured to include an operation template management table that manages a plurality of operation templates describing at least one procedure for managing the operation of the customer system; a conflict determination unit that determines whether or not, upon execution of a specific procedure included in a specific operation template among the plurality of operation templates, a conflict hindering execution of another procedure included in another operation template among the plurality of operation templates will be generated; and a presentation unit that presents information on the specific procedure to the outside before the specific procedure is actually executed in a case where the conflict determination unit determines that execution of the specific procedure will generate the conflict.

Furthermore, the present invention includes a conflict determination step in which the conflict determination unit of the operation management system determines whether or not, upon execution of a specific procedure included in a specific operation template among a plurality of operation templates describing at least one procedure for managing the operation of the system, a conflict possibly hindering execution of another procedure included in another operation template among the plurality of operation templates will be generated; and a presentation step in which a presentation unit of the operation management system presents information on the specific procedure to the outside before the specific procedure is actually executed in a case where the conflict determination unit determines that execution of the specific procedure will generate the conflict.

Furthermore, the present invention includes steps which are run on a computer, namely, a conflict determination step in which the conflict determination unit of the operation management system is made to determine whether or not, upon execution of a specific procedure included in a specific operation template among a plurality of operation templates describing at least one procedure for managing the operation of the system, a conflict possibly hindering execution of another procedure included in another operation template among the plurality of operation templates will be generated; and a presentation step in which a presentation unit of the operation management system is made to present information on the specific procedure to the outside before the specific procedure is actually executed in a case where the conflict determination unit determines that execution of the specific procedure will generate the conflict.

According to the present invention, it is possible to realize the operation management system, the operation management method, and the operation management program that enable a reduction in operating costs associated with system changes.

BRIEF DESCRIPTION OF THE DRAWINGS

FIG. 5 is a diagram illustrating a configuration example of an operation template management table illustrated in FIG. 2;

FIG. 6 is a diagram illustrating a configuration example of a procedure management table illustrated in FIG. 2;

FIG. 8 is a diagram illustrating a configuration example of a namespace management table illustrated in FIG. 2;

FIG. 11 is a flowchart illustrating an example of a procedure for resolution proposal search processing;

FIG. 12 is a diagram illustrating an example of a conflict content presentation screen;

FIG. 13 is a diagram illustrating an example of a conflict resolution presentation screen;

FIG. 14 is a diagram illustrating an example of a managed service screen;

FIG. 16 is a diagram illustrating an example of state transitions of customer profile setting items and setting values.

DESCRIPTION OF THE PREFERRED EMBODIMENTS

Hereinafter, an embodiment of the present invention will be described in detail with reference to the drawings.

Figure 1:
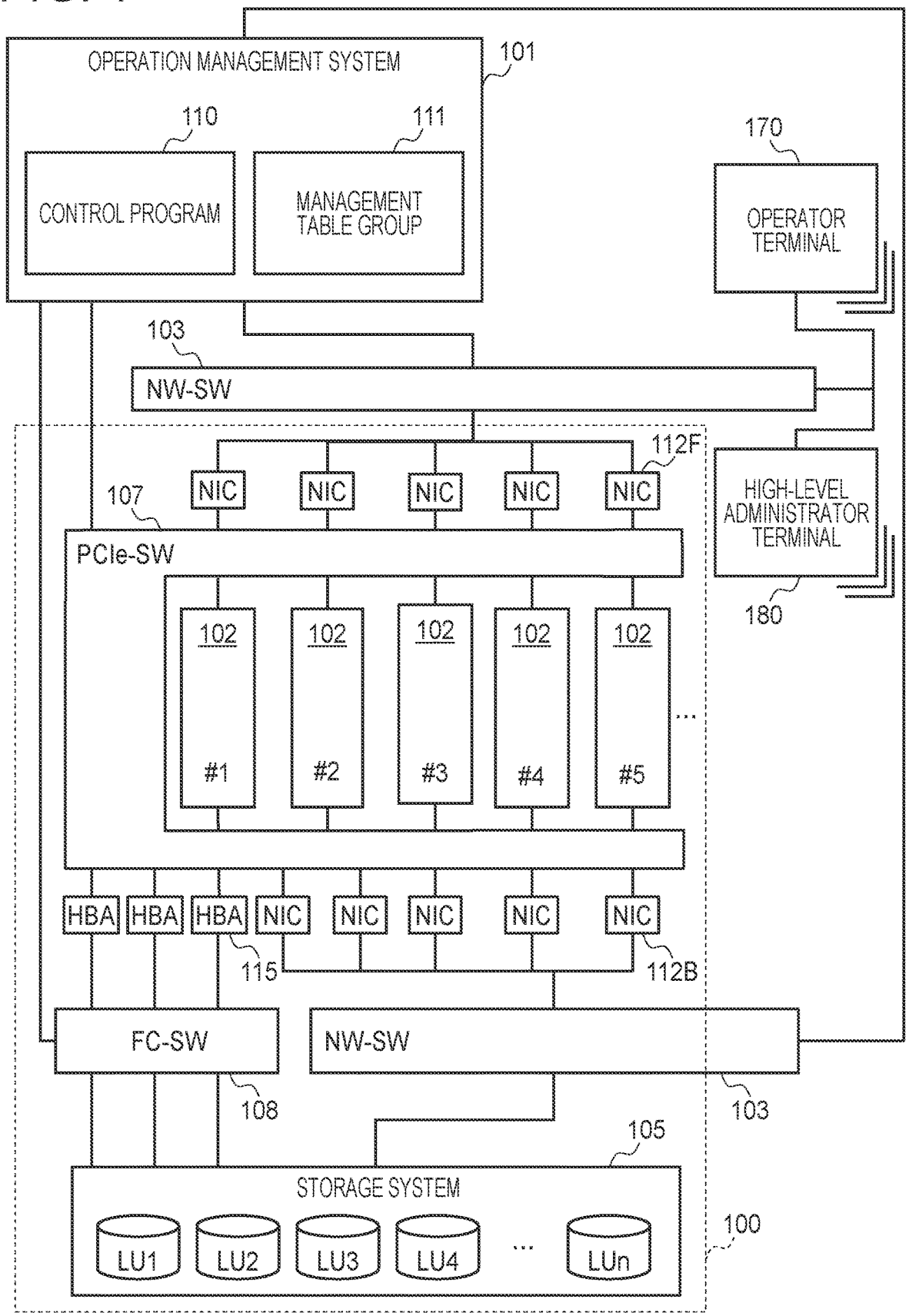
FIG. 1 is a system configuration diagram illustrating a configuration example of a computer system including an operation management system according to the present embodiment.

FIG. 1 is a system configuration diagram illustrating a configuration example of a computer system that includes an operation management system 101 according to the present embodiment. The computer system includes the operation management system 101, an operator terminal 170, a high-level administrator terminal 180, a customer system 100, and a network switch 103 (corresponding to the illustrated "NW-SW"). In the computer system, the operation management system 101, the operator terminal 170, the high-level administrator terminal 180, and the customer system 100 are connected to the network switch 103. The network switch 103 has, for example, a media access control (MAC) address table, and has a function for confirming what kind of MAC addresses the devices connected to each port have and for transmitting data only to the necessary port(s).

The operation management system 101 includes a control program 110 and a management table group 111. The control program 110 is an example of an operation management program and uses the management table group 111 to manage the operation of the customer system 100. The details will be described below; however, the operation management system 101 includes a server using at least one computer, and executes the operation management method through the operation of the operation management program on the computer.

There is a plurality of operator terminals 170, which are terminal devices operated by an operator of the customer system 100. The operator terminal 170 takes on the role of operating on the basis of procedures described in the work procedure manual. In this role, the isolation of incidents and a determination of whether or not to respond are not performed. Note that, in the present embodiment, a "procedure (specific procedure)" indicates at least one of an "operating procedure" and a "setting procedure".

There are a plurality of high-level administrator terminals 180, which are terminal devices operated by high-level administrators issuing instructions to operators operating the operator terminal 170. Here, the operator performs operation work on the basis of the disclosures of the operating procedure manual, and any and all decisions are made by the high-level administrator or by the department that developed the business task application. Such decisions include investigations regarding causes of failure, the preparation of countermeasures, and the preparation of recovery procedures. The operator performs a restart or re-execution of the application according to the outlines in the operating procedure manual only in cases where information necessary for investigation of the cause is collected (a script for log collection and a collection procedure are defined in advance in the operating procedure manual) or where there is a description in the operating procedure manual. The high-level administrator terminal 180 creates the work procedure manual and takes on the role of receiving, and considering how to handle, inquiries (escalation) from the operators, or of instructing the operators to perform work. In this role, the isolation of incidents and a determination of whether or not to respond are performed. In the high-level administrator terminal 180, a department and a member in charge may be separated for each specialized field, such as devices or software layers in addition to infrastructure (servers, networks, storage devices) and applications.

The customer system 100 is mainly configured from a server, and includes, as hardware, a network interface card (NIC) 112F, a Peripheral Component Interconnect Express (PCIe)-SWitch (SW) 107, a host bus adapter (HBA) 115, a network interface card (NIC) 112B, a fiber channel (FC)-SWitch (SW) 108, and a storage system 105 including a plurality of logical units (corresponding to the illustrated "LU1" to "LUn"). Note that the customer system 100 is not limited to or by the above configuration, and may have other configurations.

Figure 2:
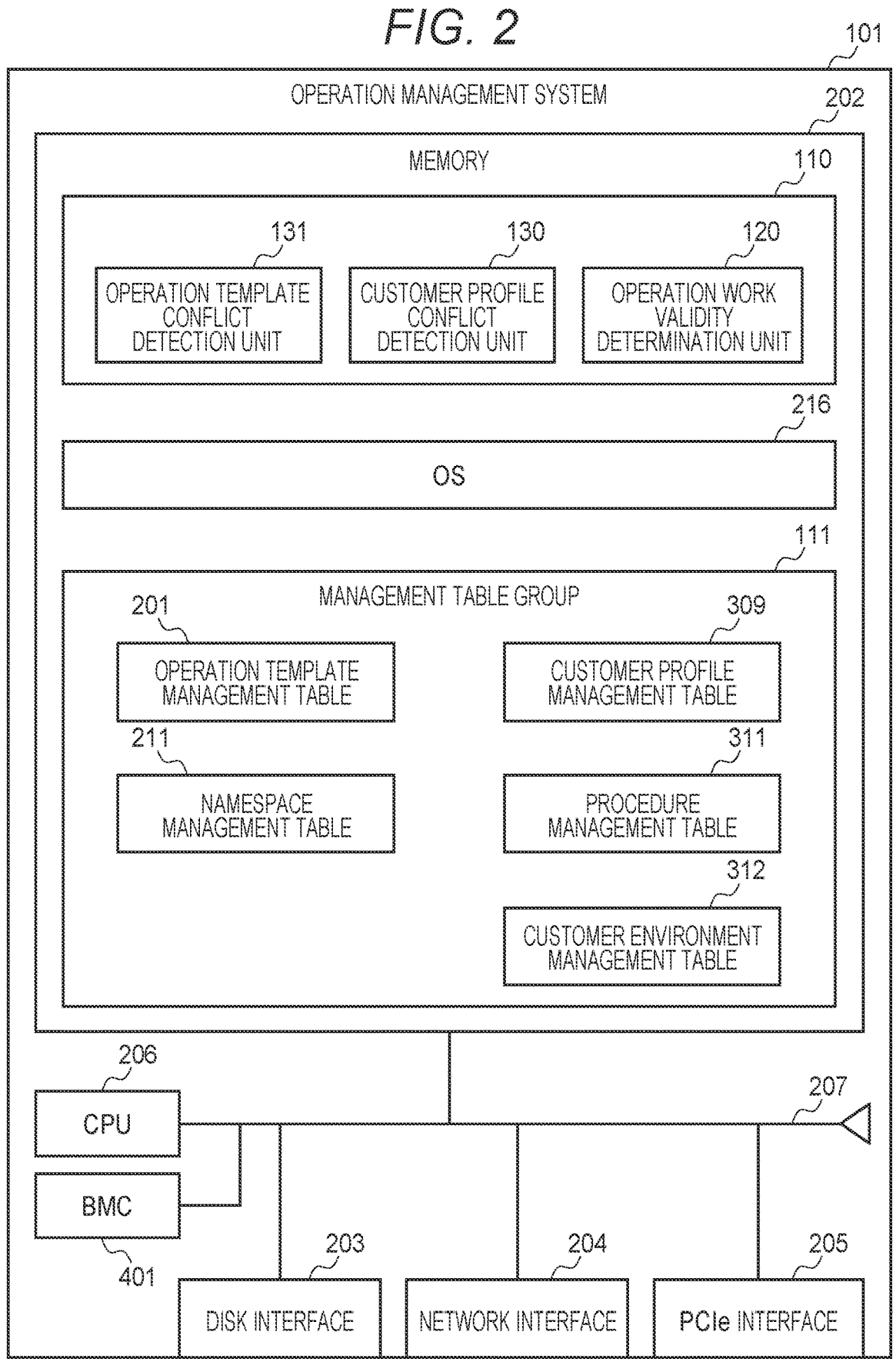
FIG. 2 is a system configuration diagram illustrating a configuration example of the operation management system illustrated in FIG. 1.

FIG. 2 is a system configuration diagram illustrating a configuration example of the operation management system 101 illustrated in FIG. 1. The operation management system 101 is configured from a server that includes a central processing unit (CPU) 206, a memory 202, a baseboard management controller (BMC) 208, a disk interface 203, a network interface 204, and a PCIe interface 205. The memory 202 includes the aforementioned control program 110, an operating system (OS) 216, and the management table group 111.

The management table group 111 includes an operation template management table 201, a customer profile management table 309, a procedure management table 311, a namespace management table 211, and a customer environment management table 312. The management table group 111 may include a priority level management table (described below).

The operation template management table 201 manages a plurality of operation templates describing at least one procedure for managing the operation of the customer system 100.

The customer profile management table 309 is a table for managing customer profiles. The customer profiles include setting items of the customer system 100 and setting values of the setting items. The procedure management table 311 manages a plurality of operating procedure manuals that include at least one operation template.

The namespace management table 211 manages namespaces relating to the setting values of the setting items of the customer profiles. The namespace management table 211 manages constraint conditions that do not permit duplication of the same namespaces for the namespaces pertaining to the setting values of the customer profile setting items. Determinations using the constraint conditions will be described below.

The customer environment management table 312 is a so-called environment setting file, for example, a file having a file name with the ".conf" extension. The customer environment management table 312 will be described below.

The control program 110 includes at least an operation template conflict detection unit 131 and a customer profile conflict detection unit 130, and preferably further includes an operation work validity determination unit 120.

The operation template conflict detection unit 131 is an example of a conflict determination unit and determines whether or not, upon execution of a specific procedure included in a specific operation template among a plurality of operation templates, a conflict will be generated (presence or absence of a conflict) which hinders execution of another procedure included in another operation template among the plurality of operation templates (presence or absence of a conflict).

The control program 110 is an example of a presentation unit, and in a case where it is determined that execution of a specific procedure included in a specific operation template will generate a conflict, the control program 110 displays information regarding the specific procedure on a screen and presents the information to the outside before the specific procedure is actually executed. Details of the screen will be described below.

The customer profile conflict detection unit 130 is an example of a conflict determination unit, and determines whether updating a setting value for a setting item of a profile of a customer (hereinafter also referred to as a "customer profile") will generate a conflict that may interfere with the execution of a procedure included in some operation templates among the plurality of operation templates.

The operation work validity determination unit 120 determines the validity of the setting values of the setting items in a customer profile. Details of the operation work validity determination unit 120 will be described below.

Figure 3:
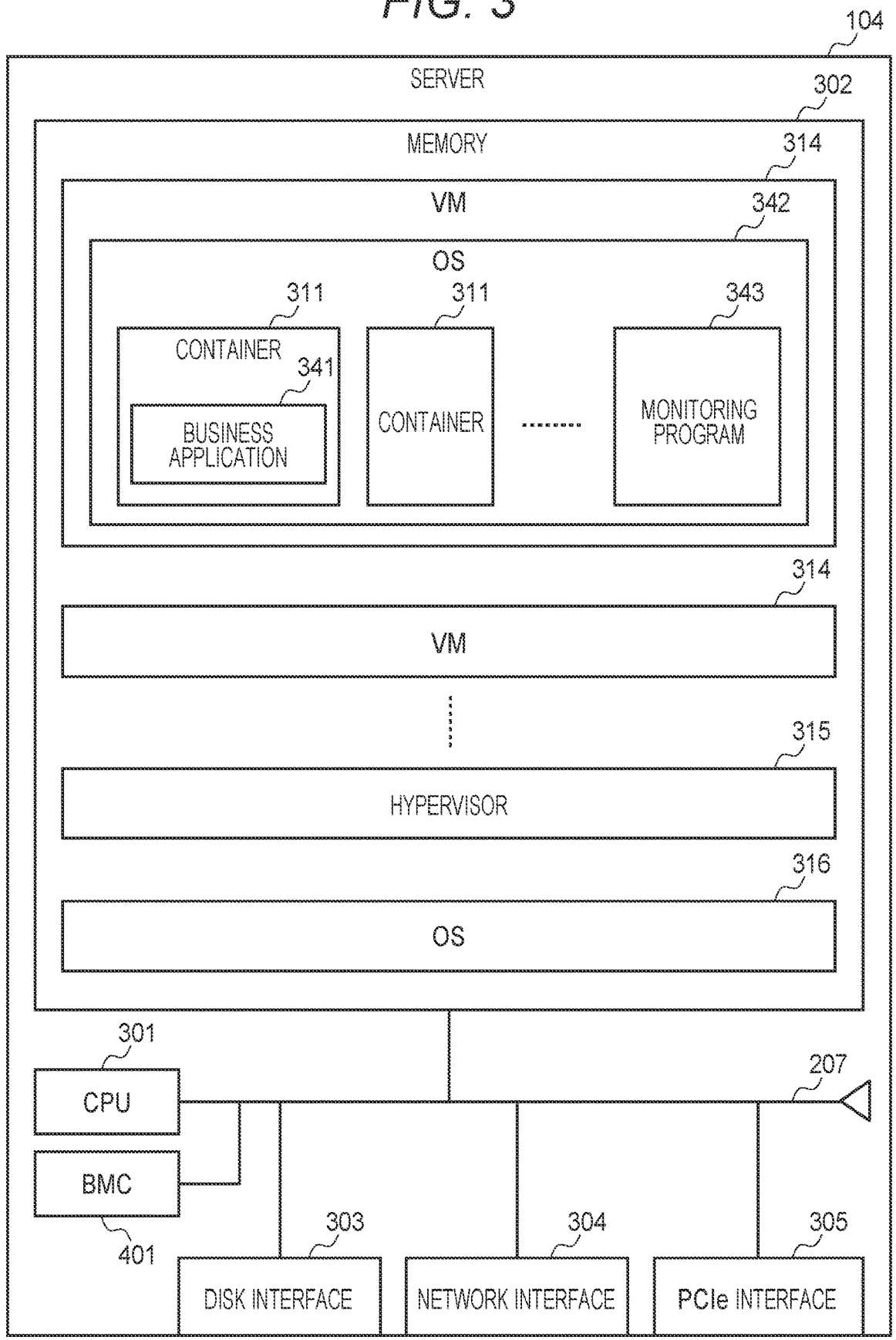
FIG. 3 is a system configuration diagram illustrating a configuration example of a server constituting a customer system illustrated in FIG. 1.

FIG. 3 is a system configuration diagram illustrating a configuration example of a server 104 constituting the customer system 100 illustrated in FIG. 1. The customer system 100 has a configuration in which a primary site can be switched in accordance with disaster recovery (DR), which is described further below. The server 104 is configured from a computer that includes a CPU 301, a memory 302, a BMC 401, a disk interface 303, a network interface 304, and a PCIe interface 305.

The BMC 401, the disk interface 303, the network interface 304, and the PCIe interface 305 of the server 104 have substantially the same functions, respectively, as the BMC 208, the disk interface 203, the network interface 204, and the PCIe interface 205 of the operation management system 101 described above.

In the network interface 304, an Internet protocol (IP) address to be described below can be set as an example of a setting value of a setting item in a customer profile. The setting value of the setting item in the customer profile is not limited to an IP address like that described above, and may be a setting value of another setting item.

The memory 202 includes a plurality of virtual machines (VMs) 314, a hypervisor 315, and an OS 316. The VM 314 stores a plurality of containers 331 including the business task application 341 and stores a monitoring program 343. The monitoring program 343 monitors the operating state of each business task application 341. Note that the configuration of the server 104 as described above is an example, and is not limited to the above configuration, rather, other configurations may be used.

Figure 4:
FIG. 4 is a diagram illustrating a configuration example of a customer environment management table illustrated in FIG. 2.

FIG. 4 is a diagram illustrating a configuration example of a customer environment management table 312 illustrated in FIG. 2. The customer environment management table 312 manages the environment of the customer system 100. The customer environment management table 312 is a table that manages records which include an identifier (ID) 701, a customer identifier (ID) 702, a classification 703, an item 704, and a range 705.

The ID 701 indicates an identifier for discriminating between records. The customer ID 702 is an identifier for discriminating between customers. The classification 703 indicates the classification of a device or the like included in the customer system 100 indicated by the customer ID 702. The item 704 indicates an item included in the classification indicated by the classification 703. The range 705 indicates the range for a namespace that is permissible for the value of an item indicated by an item 404.

FIG. 5 is a diagram illustrating a configuration example of the operation template management table 201 illustrated in FIG. 2. The operation template management table 201 is a table for managing records which include an identifier (ID) 801, an operation template name 802, and a procedure 803.

The ID 801 indicates an identifier for discriminating between records. The operation template name 802 indicates the name of each operation template. The procedure 803 indicates each procedure included in each operation template.

FIG. 6 is a diagram illustrating a configuration example of a procedure management table 311 illustrated in FIG. 2. The procedure management table 311 manages each procedure included in at least one operation template among the plurality of operation templates managed by the operation template management table 201 (see FIG. 5). The procedure management table 311 is a table that manages records which include a procedure identifier (ID) 901, a body 902, an attribute 903, a conflict 904, and a resolution proposal 905.

A procedure identifier (ID) 901 indicates an identifier for discriminating between records. The body 902 indicates the content of the body in which the procedure is described. The attribute 903 indicates information on whether or not to change the configuration of the customer system 100. For example, the attribute 903 indicates, for example, that "R (Read)" is read only, that is, changes are not permitted, and indicates that "W (Write)" may also be performed, that is, changes are permitted.

A conflict 904 indicates a result of determining whether a conflict has occurred. The conflict 904 stores a detection result regarding which variable of which procedure is in conflict. The resolution proposal 905 stores a resolution that can be presented. As such a resolution, for example, it is possible to present a name proposal relating to eliminating namespace duplication.

As described above, the procedure management table 311 is an example of an attribute management table, and manages information regarding whether to set an attribute (W), which enables changes to system operation, or set an attribute (R), which does not enable changes to the system operation. As a result of referring to the attribute management table, in a case where the specific procedure described in the specific operation template is a procedure for changes to system operation even though the specific procedure has the attribute (R), which does not enable the changes to the system operation, the operation template conflict detection unit 131 determines that a conflict will be generated.

Figure 7:
FIG. 7 is a diagram illustrating a configuration example of a customer profile management table illustrated in FIG. 2.

FIG. 7 is a diagram illustrating a configuration example of the customer profile management table 309 illustrated in FIG. 2. The customer profile management table 309 manages customer profiles. The customer profile management table 309 is a table that manages customer profiles and manages records which include an identifier (ID) 1001, a customer ID 1002, a variable (setting item) 1003, and a value (setting value) 1004. The customer profile includes a setting value of at least one setting item. The setting items in a customer profile will be described below.

The ID 1001 indicates an identifier for discriminating between records. The customer ID 1002 indicates an identifier for discriminating between customers operating the customer system 100. A variable indicated by the variable 1003 indicates a customer profile setting item. The value 1004 indicates the setting value of the setting item indicated by the variable 1003, and represents an example of a so-called Config file having a file name with the ".conf" extension, for example.

FIG. 8 is a diagram illustrating a configuration example of the namespace management table 211 illustrated in FIG. 2. The namespace management table 211 manages rules on whether or not setting item and setting value namespaces are duplicable. The namespace management table 211 is a table that manages records which include an identifier (ID) 1101, a customer name 1102, an item 1103, a range 1104, a duplication permission 1105, and a valid range 1106.

The identifier (ID) 1101 indicates an identifier for discriminating between records. The customer name 1102 indicates a customer name for operating the customer system 100. The item 1103 indicates an item that sets a constraint on the namespace. The range 1104 indicates a range that can be used for the item designated by the item 1103.

The duplication permission 1105 indicates whether or not duplication of the same item is permitted for the item designated in the item 1103. The valid range 1106 indicates a range (for only a specific customer or for multiple customers) for which a namespace constraint is valid. In the valid range 1106, "all" indicates whether or not the constraint is imposed for a plurality of customers. For example, in the valid range 1106, in a case where the duplication permission 1105 is "NG", this indicates that duplication is not permitted between different customers, whereas in a case where the duplication permission 1105 is "OK", this indicates that duplication is permitted between different customers. Examples of "all" include the following cases. For example, in a mail service, a mail address is unique key information, and the same mail address is not permitted in the same service. It is necessary to impose duplication constraints for a plurality of customers.

Figure 9:
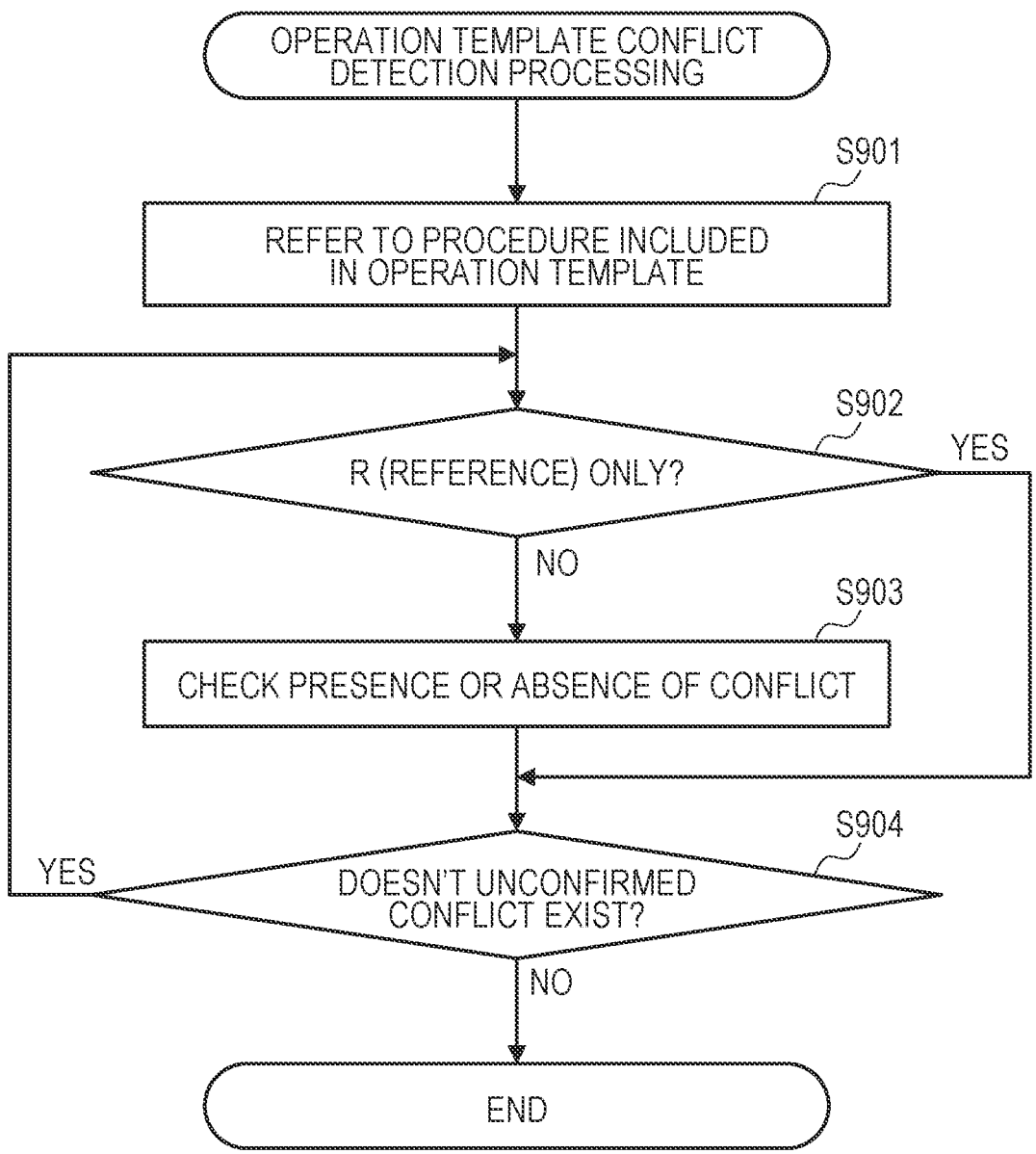
FIG. 9 is a flowchart illustrating an example of a procedure for operation template conflict detection processing.

FIG. 9 is a flowchart illustrating an example of a procedure for operation template conflict detection processing. The operation template conflict detection processing is performed by the operation template conflict detection unit 131 illustrated in FIG. 2.

In step S901, the operation template conflict detection unit 131 acquires each procedure by referring to the operation template management table 201 (see FIG. 5) by using the ID of the operation template as a search key, references the attribute of the attribute 903 corresponding to each procedure by using each procedure as a search key in referring to the procedure management table 311, and thus confirms whether or not the attribute is "R (reference only)".

In a case where the attribute is "R (reference only)", the operation template conflict detection unit 131 executes step S904 (described below), and in a case where the attribute is not "R (reference only)", the operation template conflict detection unit executes step S903.

In step S903, the operation template conflict detection unit 131 checks whether there is a conflict. This is because, in the aforementioned case where the attribute is not "R (reference only)", if there is a change in system configuration of the customer system 100 or in the setting values of the setting items, a conflict may be generated.

In step S904, the operation template conflict detection unit 131 determines whether there is an unconfirmed conflict. Specifically, the operation template conflict detection unit 131 checks whether there is an unconfirmed conflict. In a case where there is no unconfirmed conflict, the operation template conflict detection unit 131 ends the operation template conflict detection processing, whereas in a case where there is an unconfirmed conflict, the operation template conflict detection unit returns to step S902 above to execute step S902 and subsequent steps.

When there is no unconfirmed conflict and the operation template conflict detection processing ends, the operation work validity determination unit 120 executes the validity determination processing of the operation template. In the operation template validity determination processing, in a case where the detected conflict is taken into account, the operation work validity determination unit 120 determines whether implementation of each procedure included in the operation template is valid from the viewpoint of continuous operation of the system.

Here, the operation management method of the operation management system 101 according to the present embodiment includes: a conflict determination step in which the operation template conflict detection unit 131, which is an example of the conflict determination unit of the operation management system 101, determines whether or not, upon execution of a specific procedure included in a specific operation template among a plurality of operation templates describing at least one procedure for managing operation of the customer system 100, a conflict possibly hindering execution of another procedure included in another operation template among the plurality of operation templates will be generated; and a presentation step in which a conflict content presentation screen 1200, which is an example of the presentation unit of the operation management system 101, presents information on the specific procedure to the outside before the specific procedure is actually executed in a case where it is determined by the operation template conflict detection unit 131 that the execution of the specific procedure will generate the conflict.

Furthermore, in the present embodiment, the control program 110 causes, to run on a computer, a conflict determination step in which the operation template conflict detection unit 131, which is an example of the conflict determination unit of the operation management system 101, is made to determine whether or not, upon execution of a specific procedure included in a specific operation template among a plurality of operation templates describing at least one procedure for managing operation of the customer system 100, a conflict possibly hindering execution of another procedure included in another operation template among the plurality of operation templates will be generated; and a presentation step in which a conflict content presentation screen 1200, which is an example of the presentation unit of the operation management system 101, is made to present information on the specific procedure to the outside before the specific procedure is actually executed in a case where it is determined by the operation template conflict detection unit 131 that the execution of the specific procedure will generate the conflict.

Figure 10:
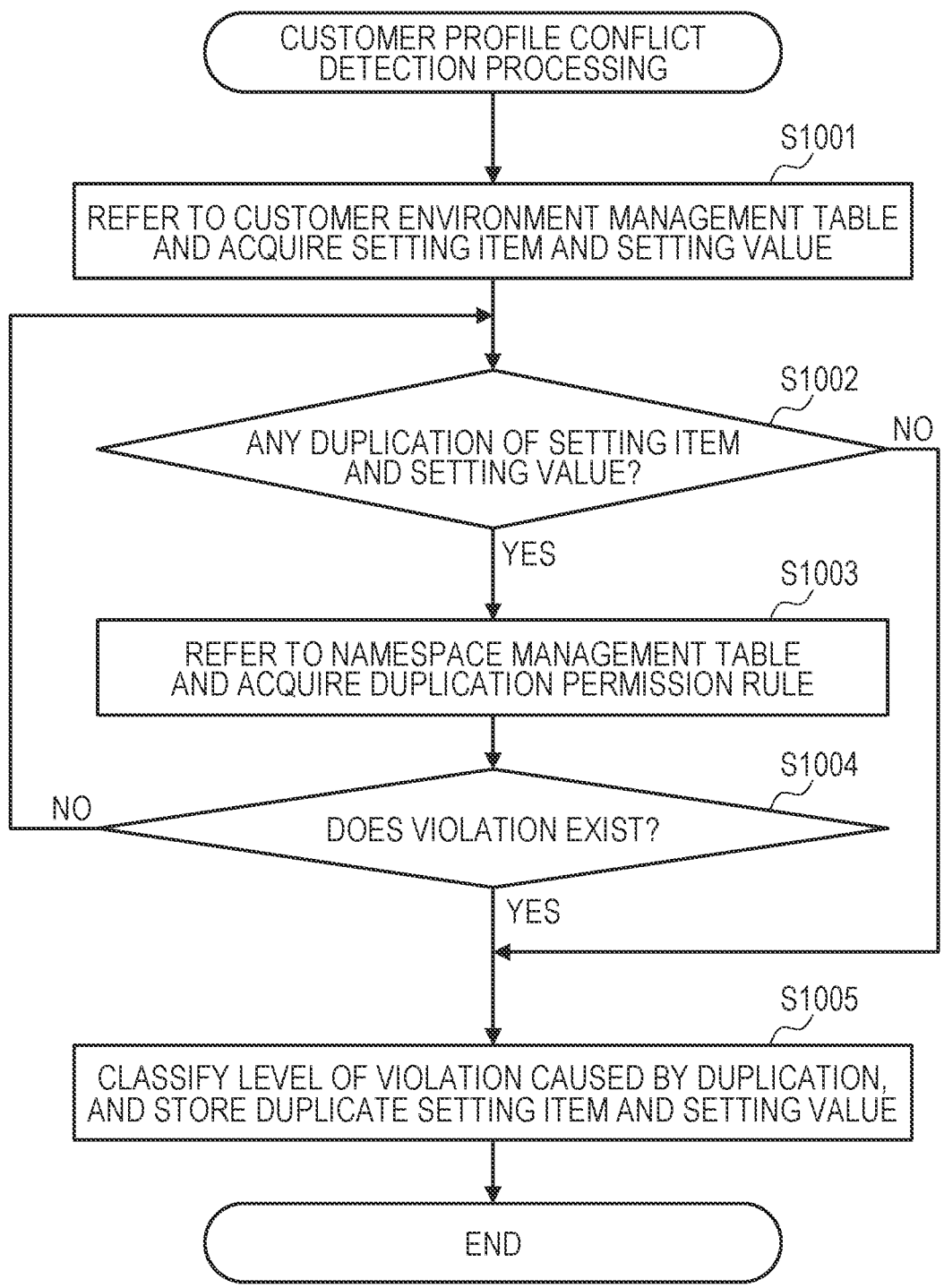
FIG. 10 is a flowchart illustrating an example of a procedure for customer profile conflict detection processing.

FIG. 10 is a flowchart illustrating an example of a procedure for customer profile conflict detection processing. This customer profile conflict detection processing is executed by the customer profile conflict detection unit 130 illustrated in FIG. 2.

As described above, the operation management system 101 according to the present embodiment includes a customer profile constituting an example of a profile that manages setting items for managing operation of a system, and that includes, as the setting items, a setting item indicating an attribute of the system, and a setting value of the setting item. The customer profile conflict detection unit 130 is an example of a conflict determination unit, and determines whether updating a setting value for a setting item of a customer profile will generate a conflict that may interfere with the execution of a procedure included in some operation templates among the plurality of operation templates.

In step S1001, the customer profile conflict detection unit 130 refers to the customer environment management table 312 by using the ID of the customer profile as a search key, and acquires setting items and setting values. In step S1002, the customer profile conflict detection unit 130 determines whether there is duplication of setting items and setting values.

The customer profile conflict detection unit 130 executes step S1005 (described below) in a case of determining that there is no duplication of setting items and setting values, and executes step S1003 in a case of determining that there is duplication of setting items and setting values.

In step S1003, the customer profile conflict detection unit 130 refers to the namespace management table 211, and acquires rules on whether or not setting item and setting value namespaces are duplicable. The namespace management table 211 manages, as the rule, a constraint condition that does not permit duplication of the same namespace for the namespace pertaining to the setting value of the setting item.

In step S1004, the customer profile conflict detection unit 130 refers to the namespace management table 211 and determines whether there is a violation of the above-described constraint condition. If there is no violation, the customer profile conflict detection unit 130 returns to step S1002, but executes step S1005 in a case where a violation exists.

In step S1005, the customer profile conflict detection unit 130 sorts the levels of violations caused by duplication, and stores the duplicate setting items and setting values in a predetermined area of the memory 202. The customer profile conflict detection unit 130 presents at least setting items and setting values on a conflict content presentation screen 1200 to be described below.

The operation work validity determination unit 120 executes validity determination processing for a customer profile. In the customer-profile validity determination processing, in a case where the content of the foregoing violation is taken into account, the operation work validity determination unit 120 determines whether or not the setting value of the setting item in the customer profile is valid from the viewpoint of continuous operation of the system.

FIG. 11 is a flowchart illustrating an example of a procedure for resolution proposal search processing. The resolution proposal search processing is executed by the operation work validity determination unit 120. In step S1101, the operation work validity determination unit 120 refers to the namespace management table 211, and acquires the setting item and the setting value of the point where the violation occurred and the rule on whether the namespaces are duplicable.

In step S1102, the operation work validity determination unit 120 acquires the type of the subject of the violation. In step S1103, the operation work validity determination unit 120 determines whether or not it is possible to set a value (set value), for setting items, to avoid duplication. The operation work validity determination unit 120 executes step S1105 (described below) in a case where it is determined that it is not possible to set a value to avoid duplication, and executes step S1104 in a case where it is determined that it is possible to set a value to avoid duplication.

In step S1104, the operation work validity determination unit 120 sets a value (set value) for the setting item and stores the value in the customer environment management table 312. In step S1105, the operation work validity determination unit 120 determines whether or not a point of violation remains. In a case where a point of violation remains, the operation work validity determination unit returns to, and executes, step S1101 described above, whereas, in a case where no point of violation remains, the operation work validity determination unit 120 ends the process of searching for a resolution proposal.

FIG. 12 is a diagram illustrating an example of the conflict content presentation screen 1200. The conflict content presentation screen 1200 includes an identifier (ID) 1201, a customer ID 1202, a conflict site 1203, a conflict destination 1204, and a reason 1205.

An identifier (ID) 1201 is an identifier for discriminating between operation templates. The customer ID 1202 is an identifier for discriminating, from other customers, the customer operating the operation template indicated by the ID 1201.

The conflict site 1203 indicates any one of an operation template procedure, the setting value of a setting item of the customer profile, or the customer name, which are the conflict sources where a conflict may occur. The conflict destination 1204 indicates an operation template procedure or the setting value of a setting item of the customer profile, of the conflict destination where a conflict may occur. Note that, in a case where no conflict occurs (for example, in a case where the ID 1201 is "n"), the conflict destination 1204 is indicated as "no conflict". The reason 1205 indicates the reason why a conflict occurs.

In the present embodiment, the conflict content presentation screen 1200 is an example of a presentation unit, and in a case where it is determined by the operation template conflict detection unit 131 (conflict determination unit) that execution of a specific procedure will generate a conflict, the conflict content presentation screen 1200 presents information regarding the specific procedure to the outside before the specific procedure is actually executed.

In a case where it is determined by the operation template conflict detection unit 131 that execution of a specific procedure will generate a conflict, the conflict content presentation screen 1200 presents, for example, a customer name to the outside as information regarding the customer system 100 for which the specific procedure is to be executed, together with the specific procedure.

FIG. 13 is a diagram illustrating an example of a conflict resolution presentation screen 1300. The conflict resolution presentation screen 1300 includes an identifier (ID) 1301, information 1302, a customer ID 1303, a conflict site 1304, a conflict destination 1305, and a resolution 1306.

In the present embodiment, upon determining that a conflict has been generated for the customer profile, for example, the customer profile conflict detection unit 130 presents at least the setting value of the setting item on the conflict resolution presentation screen 1300 (presentation unit).

The ID 1301 is an identifier for discriminating between customer profiles or operation templates. The information 1302 indicates information corresponding to the degree of conflict, and is set to "warning" at a warning level, set to "error" at a level at which system operation is hindered, and set to "information" at a level denoting only the degree of reference information.

The customer ID 1203 is an identifier for discriminating, from other customers, the customer operating the customer profile or the operation template indicated by the ID 1301. The conflict site 1304 indicates a specific site (setting value of setting item, procedure) of a customer profile and an operation template for which it is determined that there is a conflict.

The conflict destination 1305 indicates a specific conflict destination constituting a counterpart, which is a conflict point where a conflict may occur in each customer profile or each operation template. The resolution 1306 indicates a resolution pertaining to the conflict point indicated by the conflict destination 1204. For example, it can be seen that it has been determined that "$hostName" of "000-0001" in the "customer profile" indicated by the conflict site 1304 for which the ID 1301 is "2" is in conflict with "$hostName" of "procedure 2-1" of the "operation template 2" indicated by the conflict destination 1305 and also in conflict with "$hostName" of "procedure 3-3" of the "operation template 3" indicated by the conflict destination 1305. Note that, in a case where there is no conflict destination in the customer profile (for example, in a case where the ID 1301 is "n"), the conflict destination 1305 is indicated as "no conflict".

The resolution 1306 indicates a resolution plan for at least one of the customer profile and the operation template. The resolution 1306 indicates a resolution plan for avoiding trouble in a case where updating a procedure of an operation template hinders the execution of a procedure of another operation template or in a case where updating the value of a setting item of a customer profile may hinder the execution of an operation template procedure.

In the present embodiment, a priority level management table (not illustrated) of the management table group 111 manages, in a case where it is determined by the operation template conflict detection unit 131 that execution of a specific procedure will generate a conflict, which procedure should be prioritized among other procedures generating a conflict and the specific procedure. In a case where it is determined that execution of a specific procedure will generate a conflict, the operation template conflict detection unit 131 may refer to the priority level management table and present a priority level to a managed service screen 1400 (presentation unit) to be described below.

FIG. 14 is a diagram illustrating an example of a managed service screen 1400. The managed service screen 1400 includes an identifier (ID) 1301, information 1302, a responsible party 1307, a conflict site 1304, a conflict destination 1305, and a priority level 1308. In the managed service screen 1400, the content indicated by the identifier (ID) 1301, the information 1302, the conflict site 1304, and the conflict destination 1305 are similar to the content indicated by the identifier (ID) 1301, the information 1302, the conflict site 1304, and the conflict destination 1305 on the conflict resolution presentation screen 1300 illustrated in FIG. 13 described above, respectively, and thus a description thereof will be omitted.

The responsible party 1307 indicates the name of the team in charge corresponding to the information indicated by each piece of information 1302. The priority level 1308 indicates a priority level for handling, and priorities are set in the order "S", "A", "B", and "C", from the highest to the lowest, for example.

Figure 15:
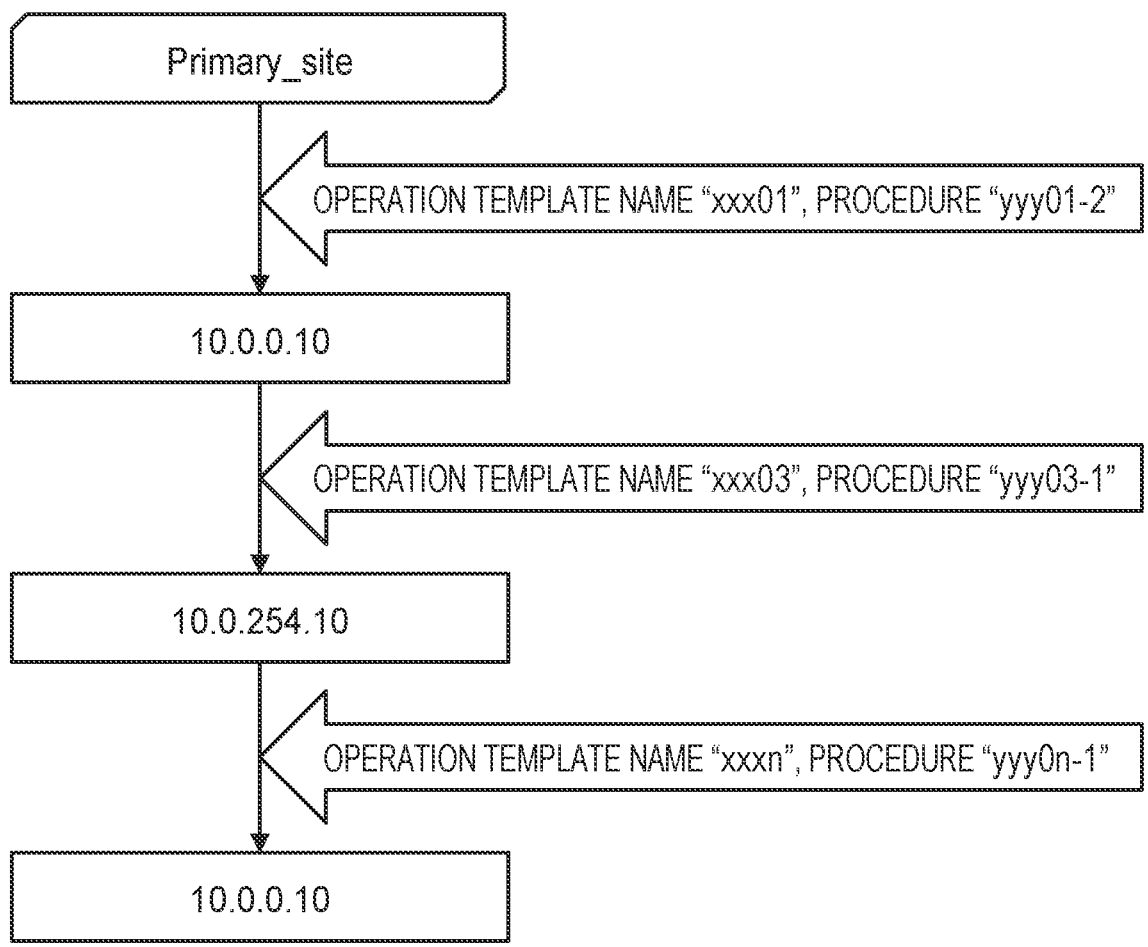
FIG. 15 is a diagram illustrating an example of a state transition diagram of customer profile setting items and setting values.

FIG. 15 is a diagram illustrating an example of state transitions of customer profile setting items and setting values. As illustrated in the drawing, the "procedure yyy01-2" of the operation template having the name "xxx01" is implemented to register the customer profile as the primary site of the disaster recovery (DR) setting. As a result, an Internet protocol (IP) address, which constitutes an example of a setting item in the customer profile is updated to "10.0.0.10", for example.

Next, "procedure yyy03-1" of the operation template having the name "xxx03" is implemented to switch the customer profile to a secondary site for DR switching. As a result, an IP address, which constitutes an example of a setting item in the customer profile, is updated to "10.0.254.10", for example.

Next, in the customer profile, the "procedure yyy0n-1" of the operation template having the name "xxxn" is performed, and thus the primary site returns to the original site due to the DR switch-back (after recovery). As a result, an IP address, which constitutes an example of a setting item in the customer profile, is updated to "10.0.0.10", for example.

FIG. 16 is a diagram illustrating an example of the state transitions of customer profile setting items and the setting values according to the state transition example in FIG. 15. The aforementioned customer profile relates to a customer having a customer ID 1502 of "000-0001", and the IP address of the primary site indicated by the variable 1504 is changed as indicated by the value 1505 in the event of the trigger indicated by the trigger 1506.

As described above, in the present embodiment, the conflict resolution presentation screen 1300 is an example of a presentation unit, and in a case where it is determined by the customer profile conflict detection unit 130 (conflict determination unit) that execution of a specific procedure will generate a conflict, the conflict resolution presentation screen 1300 presents information regarding the specific procedure to the outside before the specific procedure is actually executed.

The operation management system 101 according to the present embodiment includes an operation template management table that manages a plurality of operation templates describing at least one procedure for managing the operation of the customer system 100; a conflict determination unit that determines whether or not, upon execution of a specific procedure included in a specific operation template among the plurality of operation templates, a conflict hindering execution of another procedure included in another operation template among the plurality of operation templates will be generated; and a presentation unit that presents information on the specific procedure to the outside before the specific procedure is actually executed in a case where the conflict determination unit determines that execution of the specific procedure will generate the conflict.

The operation management method according to the present embodiment includes: a conflict determination step in which the operation template conflict detection unit 131, which is an example of the conflict determination unit of the operation management system 101, determines whether or not, upon execution of a specific procedure included in a specific operation template among a plurality of operation templates describing at least one procedure for managing an operation of the customer system 100, a conflict possibly hindering execution of another procedure included in another operation template among the plurality of operation templates will be generated; and a presentation step in which a conflict content presentation screen 1200, which is an example of the presentation unit of the operation management system 101, presents information on the specific procedure to the outside before the specific procedure is actually executed in a case where it is determined by the operation template conflict detection unit 131 that the execution of the specific procedure will generate the conflict.

The control program 110 (the operation management program) according to the present embodiment causes, to run on a computer: a conflict determination step in which the operation template conflict detection unit 131, which is an example of the conflict determination unit of the operation management system 101, is made to determine whether or not, upon execution of a specific procedure included in a specific operation template among a plurality of operation templates describing at least one procedure for managing operation of the customer system 100, a conflict possibly hindering execution of another procedure included in another operation template among the plurality of operation templates will be generated; and a presentation step in which a conflict content presentation screen 1200, which is an example of the presentation unit of the operation management system 101, is made to present information on the specific procedure to the outside before the specific procedure is actually executed in a case where it is determined by the operation template conflict detection unit 131 that the execution of the specific procedure will generate the conflict.

In this way, even if a certain procedure is executed on the basis of an operation template, it is possible to prevent another procedure based on another operation template from being affected, and it is possible to reduce the operating costs associated with system changes.

The operation management system 101 according to the present embodiment includes a procedure management table 311 (attribute management table) that manages information regarding whether to set the attribute "W", which enables changes to the system operation, or set the attribute "R", which does not enable changes to the system operation. As a result of referring to the procedure management table 311, the operation work validity determination unit 120 (conflict determination unit) determines that a conflict will be generated in a case where a specific procedure described in a specific operation template is a procedure for changing the system operation, even though the specific procedure has an attribute "R", which does not permit changes to the system operation. In this way, by referring to the attribute, the execution of a specific procedure described in a specific operation template can be prevented from affecting the execution of another procedure described in another operation template.

In the operation management system 101 according to the present embodiment, the procedure management table 311 manages each procedure included in at least one operation template among the plurality of operation templates managed by the operation template management table 201. In this way, even if each procedure managed in the procedure management table 311 is executed on the basis of the operation templates, it is possible to prevent other procedures based on other operation templates from being affected.

In the present embodiment, in a case where it is determined by the operation template conflict detection unit 131 that execution of a specific procedure will generate a conflict, the conflict content presentation screen 1200 presents, for example, a customer name to the outside as information regarding the customer system 100 for which the specific procedure is to be executed, together with the specific procedure. In this way, it is possible to grasp in advance a customer name that may be affected upon execution of the specific procedure that may generate a conflict.

The operation management system 101 according to the present embodiment includes a priority level management table that, in a case where it is determined by the operation template conflict detection unit 131 that execution of a specific procedure will generate a conflict, manages which procedure should be prioritized among other procedures generating a conflict and the specific procedure. In a case where it is determined that execution of a specific procedure will generate a conflict, the operation template conflict detection unit 131 described above may refer to the priority level management table and present the priority level on the conflict content presentation screen 1200. In this way, even if there is a possibility of a conflict being generated, whether the procedure should be preferentially executed can be clearly understood.

The operation management system 101 according to the present embodiment includes a customer profile that manages setting items for managing operation of a system, and that includes, as the setting items, a setting item indicating an attribute of the customer system 100 and a setting value of the setting item, wherein the operation template conflict detection unit 131 determines whether or not updating the setting value of a specific setting item of the customer profile will generate a conflict that may hinder the execution of a procedure included in some operation templates among the plurality of operation templates. In this way, it is possible to grasp in advance whether or not updating the setting value of a specific setting item of the customer profile will generate a conflict that may hinder the execution of the procedure included in some operation templates.

The operation management system 101 according to the present embodiment includes a namespace management table 211 that manages a constraint condition that does not permit duplication of the same namespace for namespaces relating to the setting values of the setting items. As a result of referring to the namespace management table 211, the operation template conflict detection unit 131 determines whether or not a constraint condition not permitting duplication of the same namespace is violated. Upon determining that there is a violation, the operation template conflict detection unit 131 presents at least the setting value of the setting item on the conflict content presentation screen 1200. In this way, it is possible to prevent the occurrence of failure due to a system change that violates a constraint condition that has been set.

In the present embodiment, in a case where the operation template conflict detection unit 131 or the customer profile conflict detection unit 130 (conflict determination unit) determines that there is a violation of the constraint condition, the operation work validity determination unit 120 determines whether or not it is possible to set, for the setting item, a setting value for avoiding duplication, and, upon determining that it is possible to set the setting value, sets the setting value for the setting item. In this way, by determining the validity of the setting value of the setting item of the customer profile before actually setting the setting value, it is possible to prevent hindrance to the operation of the system.

Although the present embodiment has been described above, the technical scope of the present invention is not limited to or by the scope disclosed in the foregoing embodiment. It is evident from the disclosures of the patent claims that the addition of various changes or improvements to the foregoing embodiment falls within the technical scope of the present invention. In the embodiment described above, an IP address is provided as an example of a setting value of a setting item of a customer profile; however, the present invention is not limited to or by this example, rather, setting values of other setting items are possible.

INDUSTRIAL APPLICABILITY

The present invention can be applied to operation management systems capable of making changes to system operations by means of procedures described in operation templates.

What is claimed is:

1. An operation management system, comprising:
a processor;
a display coupled to the processor; and
a memory, coupled to the processor, storing instructions that when executed by the processor configures the processor to:
manage a plurality of operation templates describing at least one procedure for managing operation of a system,
store an attribute management table that manages information of whether to set an attribute enabling changes to the operation of the system or set an attribute not enabling changes to the operation of the system,
determine whether, upon execution of a specific procedure included in a specific operation template among the plurality of operation templates, a conflict hindering execution of another procedure included in another operation template among the plurality of operation templates will be generated,
determine, as a result of referring to the attribute management table, that the conflict will be generated, upon determining the specific procedure described in the specific operation template is a procedure for changing the operation of the system even though the specific procedure has the attribute not enabling changes to the operation of the system, and
present, on the display, information of the specific procedure before the specific procedure is actually executed upon determining that execution of the specific procedure will generate the conflict.

2. The operation management system according to claim 1, wherein the attribute management table manages each procedure included in at least one operation template among the plurality of operation templates managed by the operation template management table.

3. The operation management system according to claim 1, wherein, the processor is configured to, upon determining execution of the specific procedure will generate the conflict, present, on the display, information regarding the system for which the specific procedure is to be executed, together with the specific procedure.

4. The operation management system according to claim 1, wherein the processor is configured to:
store a priority level management table that manages which procedure should be prioritized among other procedures generating a conflict and the specific procedure, and
upon determining that execution of the specific procedure will generate the conflict, refer to the priority level management table and present, on the display, a priority level.

5. The operation management system according to claim 1, wherein the processor is configured to:
store a profile that manages setting items for managing the operation of the system, and that includes, as the setting items, a setting item indicating an attribute of the system, and a setting value of the setting item, and
determine whether updating a setting value of a specific setting item of the profile will generate a conflict hindering execution of any procedure included in some other operation template among the plurality of operation templates.

6. The operation management system according to claim 5, wherein the processor is configured to store a namespace management table that manages a constraint condition not enabling duplication of a namespace for namespaces relating to setting values of the setting items,
determine, as a result of referring to the namespace management table, whether there is a violation of the constraint condition, and
upon determining there is a violation, present, on the display, at least the setting value of the specific setting item.

7. The operation management system according to claim 6, wherein the processor is configured to, upon determining there is a violation of the constraint condition, determine whether it is possible to set, for the specific setting item, a setting value for avoiding duplication, and, upon determining that it is possible to set the setting value for avoiding duplication, set the setting value for the specific setting item.

8. An operation management method, comprising:
storing an attribute management table that manages information of whether to set an attribute enabling changes to the operation of the system or set an attribute not enabling changes to the operation of the system;
determining whether, upon execution of a specific procedure included in a specific operation template among a plurality of operation templates describing at least one procedure for managing operation of a system, a conflict hindering execution of another procedure included in another operation template among the plurality of operation templates will be generated;
determining, as a result of referring to the attribute management table, that the conflict will be generated, upon determining the specific procedure described in the specific operation template is a procedure for changing the operation of the system even though the specific procedure has the attribute not enabling changes to the operation of the system; and
presenting, on a display, information of the specific procedure before the specific procedure is actually executed upon determining that execution of the specific procedure will generate the conflict.

9. A non-transitory computer readable medium storing an operation management program that when executed by a computer configures the computer to execute steps comprising:
storing an attribute management table that manages information of whether to set an attribute enabling changes to the operation of the system or set an attribute not enabling changes to the operation of the system;
determining whether, upon execution of a specific procedure included in a specific operation template among a plurality of operation templates describing at least one procedure for managing operation of a system, a conflict hindering execution of another procedure included in another operation template among the plurality of operation templates will be generated;

determining, as a result of referring to the attribute management table, that the conflict will be generated, upon determining the specific procedure described in the specific operation template is a procedure for changing the operation of the system even though the specific procedure has the attribute not enabling changes to the operation of the system; and presenting, on a display, information of the specific procedure before the specific procedure is actually executed upon determining that execution of the specific procedure will generate the conflict.

* * * * *